United States Patent [19]

Kadooka

[11] Patent Number: 5,606,663
[45] Date of Patent: Feb. 25, 1997

[54] PASSWORD UPDATING SYSTEM TO VARY THE PASSWORD UPDATING INTERVALS ACCORDING TO ACCESS FREQUENCY

[75] Inventor: Etsuko Kadooka, Tokyo, Japan

[73] Assignee: NEC Corporation, Tokyo, Japan

[21] Appl. No.: 340,390

[22] Filed: Nov. 15, 1994

[30] Foreign Application Priority Data

Dec. 24, 1993 [JP] Japan .................................. 5-326761

[51] Int. Cl.$^6$ ...................................................... C06F 11/00
[52] U.S. Cl. ......................................................... 395/188.01
[58] Field of Search ........................... 395/188.01, 187.01

[56] References Cited

U.S. PATENT DOCUMENTS

| | | | |
|---|---|---|---|
| 4,924,378 | 5/1990 | Hershey et al. | 364/200 |
| 5,032,979 | 7/1991 | Hacht et al. | 364/200 |
| 5,210,795 | 5/1993 | Lipnar et al. | 380/23 |

*Primary Examiner*—Robert W. Beausouel, Jr.
*Assistant Examiner*—Norman M. Wright

*Attorney, Agent, or Firm*—Foley & Lardner

[57] ABSTRACT

A password updating system sets the available period and the updating period of the password for each individual user according to the frequency of his accesses to the computer system, and manages password updating by urging the user in advance to change his password on the basis of these periods. There is a chronometric unit; and a password hysteresis memory unit for memorizing and managing passwords and their available periods. An update processing unit checks the input password, requests reentry if the same password exists or updates it if no same password exists, invalidates the current password if the updating period of the password has expired, and also validates invalidated passwords. There is a comparator unit for comparing the available periods of passwords and notifying the update processing unit of a request to update the password. Also provided is a period setting unit for prescribing, upon setting of each password, the available period and the update set period of that password on the basis of the analysis of the frequency of accesses, and conveying that information to the password hysteresis memory unit. A display unit displays various messages; and an input unit inputs various information.

2 Claims, 5 Drawing Sheets

(A), (A'), (A"): AVAILABLE PERIOD (B), (B'), (B"): UPDATE SET PERIOD

FIG. 3

(FOR USER X)

| USER NO. | AVAILABLE PERIOD YEAR.MONTH.DAY.TIME | PASSWORD |
|---|---|---|
| X | 1993 . 1 . 5 . 15 | WIND |
| X | 1992 . 7 . 10 . 8 | STORE |
| X | 1992 . 1 . 4 . 11 | MOON |
| X | 1991 . 7 . 7 . 10 | HILL |
| ⋮ | ⋮ | ⋮ |
| X | 1988 . 7 . 9 . 12 | TREE |

NEW PASSWORD

PUSH DOWN

OLD PASSWORD 5,606,663

PASSWORD UPDATING SYSTEM TO VARY THE PASSWORD UPDATING INTERVALS ACCORDING TO ACCESS FREQUENCY

BACKGROUND OF THE INVENTION

The present invention relates to the management of passwords to be used for the purpose of security at the time of logging in the computer system, and more particularly to a password updating system permitting flexible variation of password updating intervals according to the frequency of access to the system.

Conventional techniques for time-based management of passwords include a time lock-equipped security arrangement for use in a computer system with a security mechanism, characterized by its time lock mechanism permitting the limitation of access to the system or data by the access time.

There are various systems to update passwords by prescribing a time limit for each password in the management of passwords, including updating passwords at regular intervals indiscriminately for all users, or periodically updating passwords at the timing set by the system manager. Both unconditionally and immediately invalidate the old passwords upon expiration of the prescribed period and make it impossible for the users to whom the passwords were assigned to log in the computer system.

The aforementioned technique disclosed in the time lock-based security arrangement merely limits the period during which a password can be validly used, but does not update the password itself for the purpose of security management.

Or, under the system to update passwords according to a time limit prescribed in password management, the user or the manager of the system arbitrarily sets the available periods for passwords, but each user's frequency of access is not taken into account.

As a consequence, a user who seldom accesses the system may become unable to log in the system because his password has run out of its available period even if he never accessed the system during that period. Moreover, according to the prior art, the password is managed only with respect to the available period without prescribing the updating period, and is made unusable as soon as the period expires, with no advance warning given when the expiration was nearing. As a result, if the user forgets to update his password, he may be refused access to the system.

One object of the present invention is to make it possible to set the available period on the system side for each password according to the access frequency of the user whom the password identifies, prescribe a password updating period for a certain length of time immediately preceding the expiration of the available period, inform the user who logs in the system during the updating period that the expiration of his password is imminent by displaying a message requesting him to change his password, and thereby urge him to update his password. The length of the updating period is determined by that of the available period.

SUMMARY OF THE INVENTION

According to one aspect of the invention, there is provided a password updating system which sets the available period and the updating period of the password for each individual user according to the frequency of his accesses to the computer system, and manages password updating by urging in advance the user to change his password on the basis of these periods.

The system includes a chronometric unit for counting date and hour information. There is also an input unit for entering user numbers and passwords, and password validating instructions for cancelling password invalidation. A display unit displays password change requesting messages and password reentry requesting messages. Also provided is a password hysteresis memory unit for memorizing and managing passwords so far set and their available periods on a user-by-user basis.

The system further includes a comparator unit for comparing, when a password is entered into the computer system to log it in, the current date and hour given from the chronometric unit and the available period of the currently used password stored in the password hysteresis memory unit, and notifying update processing unit of a request to update the password if it is in its updating period. Also provided is an update processing unit responsive to an update request from this comparator unit for giving a request for display of a password change requesting message to the display unit, receiving an updated password from the input unit, searching passwords stored in the password hysteresis memory unit to check whether or not the same password exists among the passwords so far set, requesting reentry if it does or updating the password if it does not, invalidating the current password if the updating period of the password has expired, and also validating invalidated passwords. There is a period setting unit for analyzing the frequency of accesses to the computer system by each user by receiving a date and hour of access to the system from the chronometric unit and receiving the user number from the input unit at the date and hour of access, prescribing upon setting of each password the available period and the update set period of that password, and conveying that information to the password hysteresis memory unit.

Furthermore, the period setting unit, in prescribing the available period and the update set period of a new password, memorizes the time of each user's access to the system as analysis of the frequency of the user's accesses to the system, thereby figures out the average interval of accesses by this user, sets a period at least longer than that average access interval as the available period of the new password, and also prescribes the update set period.

BRIEF DESCRIPTION OF THE DRAWINGS

The above-mentioned objects and other objects, features and advantages of the present invention will become more apparent from the following detailed description when taken in conjunction with the accompanying drawings, wherein:

FIG. 3 is a diagram illustrating specific examples of the update hysteresis of user X's passwords and of the memorized contents of the password hysteresis memory unit 4;

DETAILED DESCRIPTION OF THE PREFERRED EMBODIMENT

Now will be described in detail a preferred embodiment of the present invention with reference to drawings.

Figure 1:
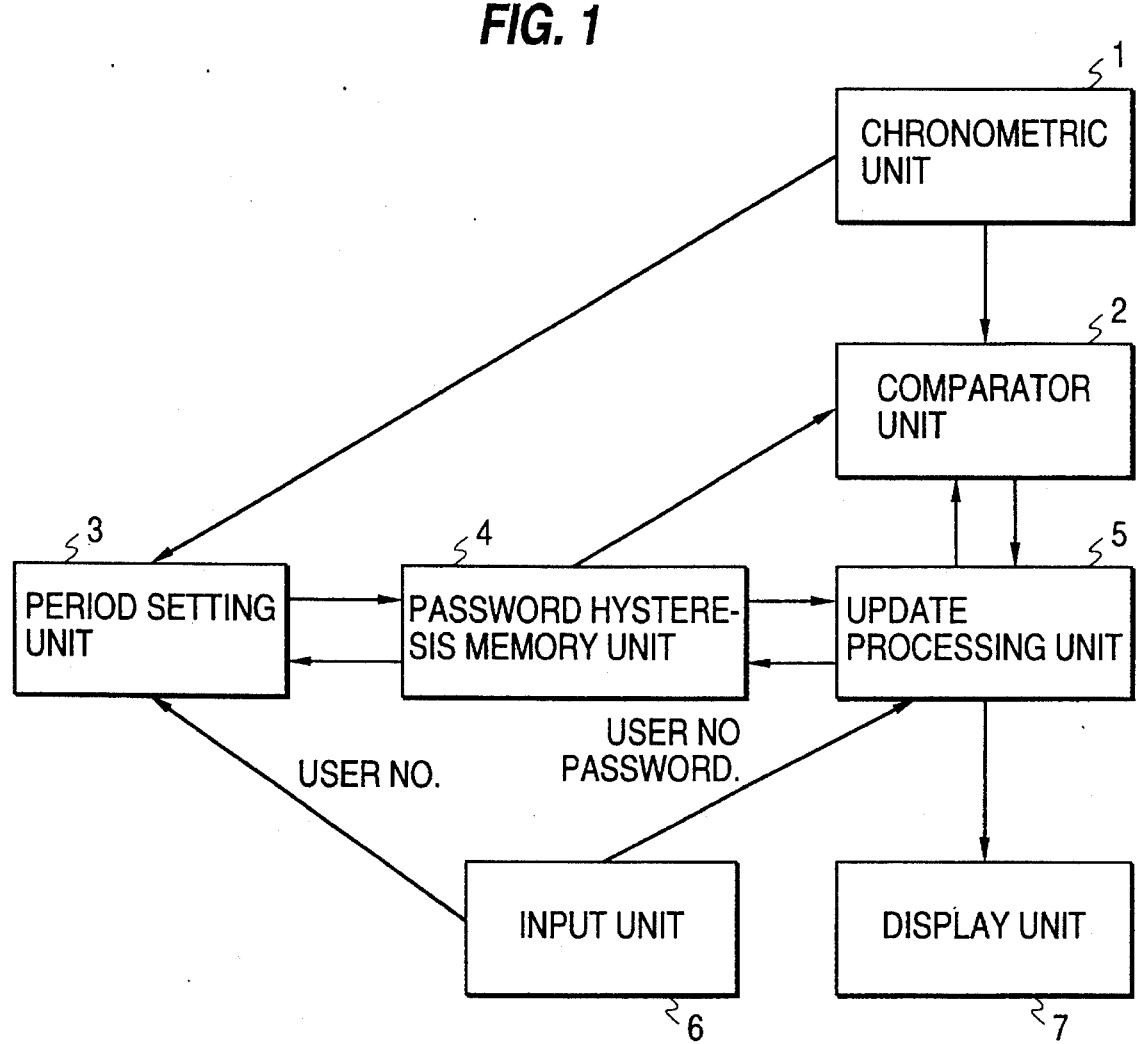
FIG. 1 illustrates one preferred embodiment of the invention.

Referring to FIG. 1, the preferred embodiment of the invention comprises a chronometric unit 1, a comparator unit 2, a period setting unit 3, a password hysteresis memory unit 4, an update processing unit 5, an input unit 6 and a display unit 7.

The chronometric unit 1 counts data and hour information.

The comparator unit 2 compares the current date and hour and the available period of a currently used password and, if the password is in its updating period, notifies said update processing unit 5 of a request for password updating.

The password hysteresis memory unit 4 memorizes and manages passwords so far set and their respective available periods on a user-by-user basis.

The period setting unit 3, by analyzing the frequency of accesses to the system by each user, prescribes the available period and update set period for each password upon its setting, and conveys that information to said password hysteresis memory unit 4.

The update processing unit 5 checks whether or not the same password as a newly input one exists among the passwords so far set, and requests reentry if it does or updates the password if it does not. If the updating period of the current password expires, the update processing unit 5 invalidates the password, and also validates invalidated passwords.

The display unit 7 displays password change request messages and reentry requesting messages.

The input unit 6 inputs user numbers and passwords, and password validating instructions for cancelling password invalidation.

Figure 2:
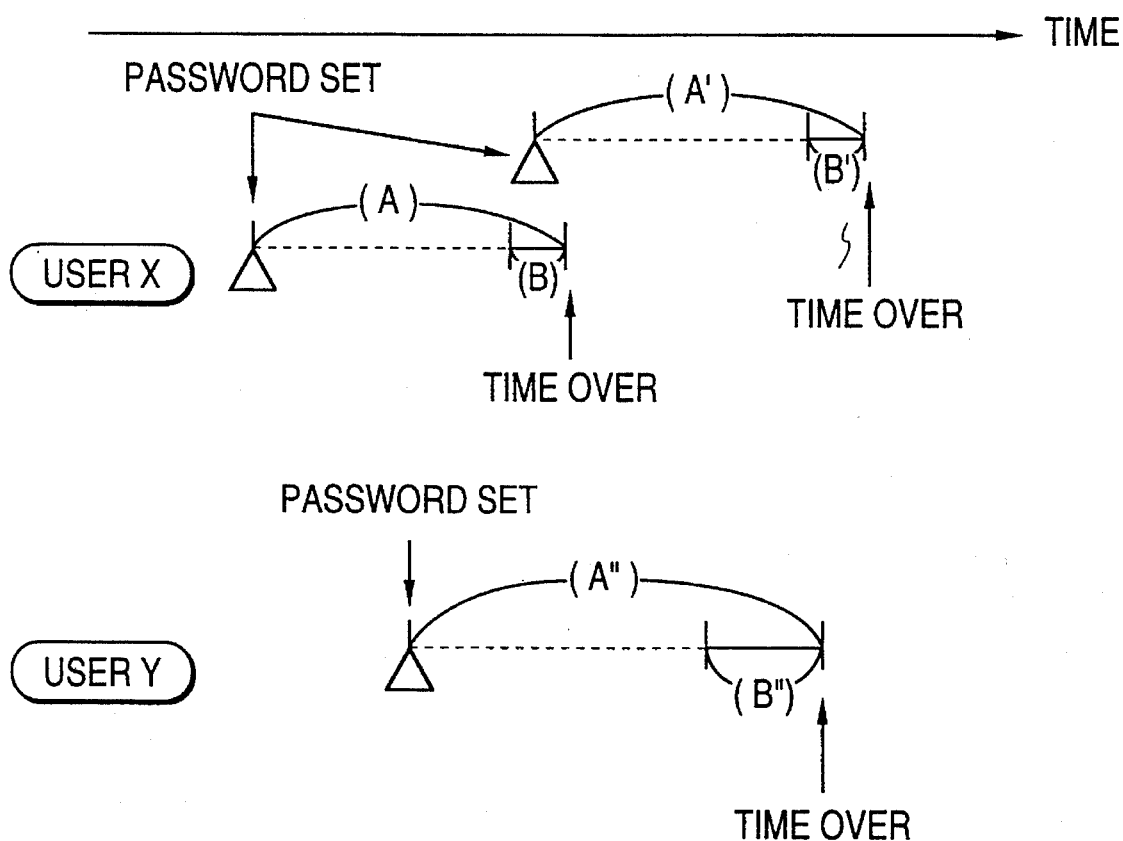
FIG. 2 is a time chart for explaining the setting, the available periods and the update set periods of user X's and user Y's passwords.

Next, with reference to FIG. 2, will be explained the available periods and update periods prescribed upon setting of user X's and user Y's passwords.

Where the available period of a password set by user X is represented by (A), a segment until the expiration of the period, accounting for a certain proportion of the available period (A), is prescribed as an update set period (B). If user X updates his password during the update set period (B), a new available period (A') is prescribed for that password and, on that basis, a new update set period (B') is also prescribed for the password.

The same applies to user Y. Upon setting of a password, an available period (A") and an update set period (B") are prescribed for his password.

The frequencies of user X's and user Y's accesses to the system are taken into account in prescribing all these available periods (A), (A') and (A").

FIG. 3 specifically shows information on passwords and available periods for user X, managed in the password hysteresis memory unit 4.

At the top of user X's memory section in the password hysteresis memory unit 4 are stored his latest password "WIND" and the date and hour of its available period, and the lower in this section, the older the password hysteresis stored.

Figure 4A:
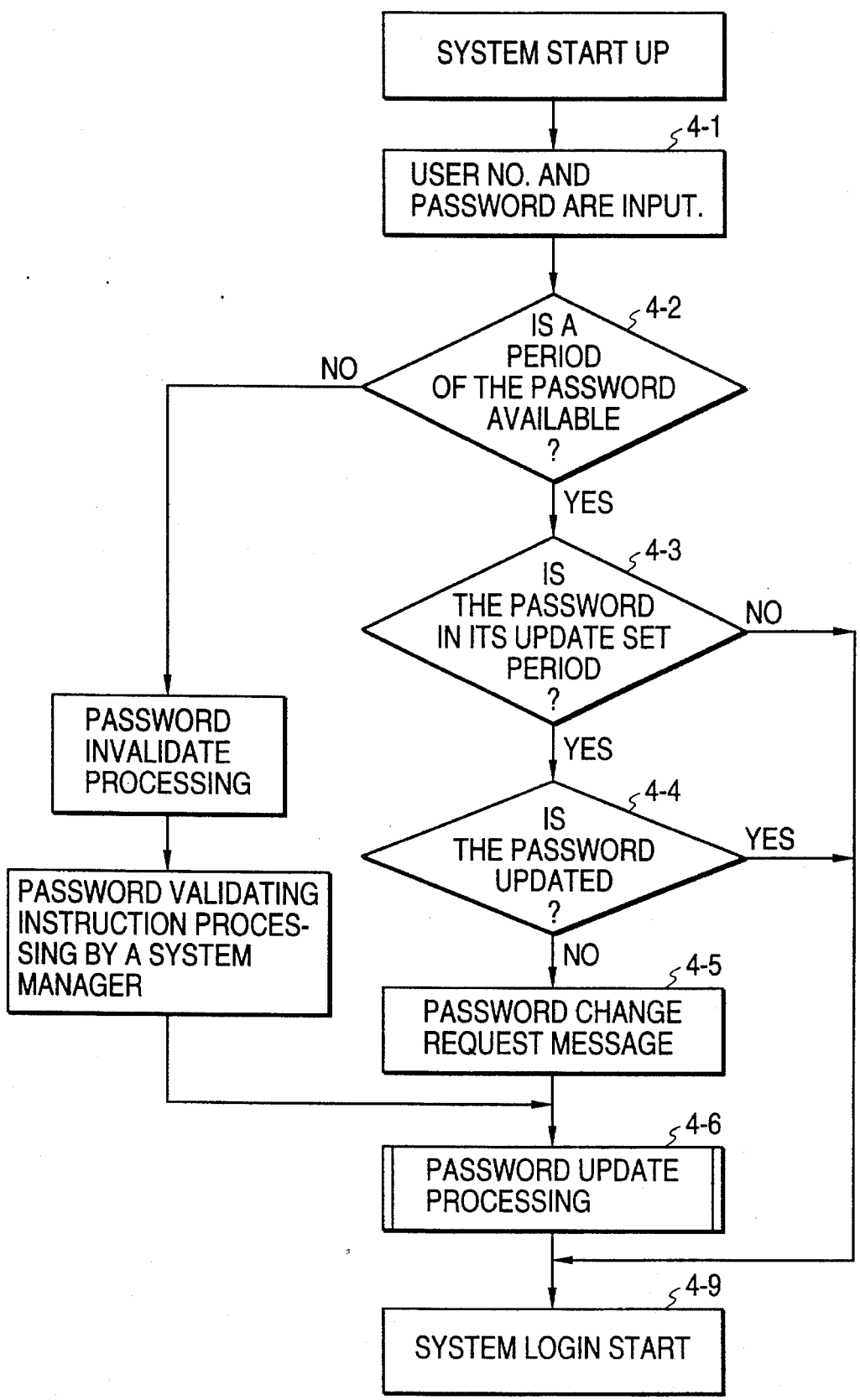
FIG. 4a is a flow chart showing the overall operation of the preferred embodiment of the invention.
Figure 4B:
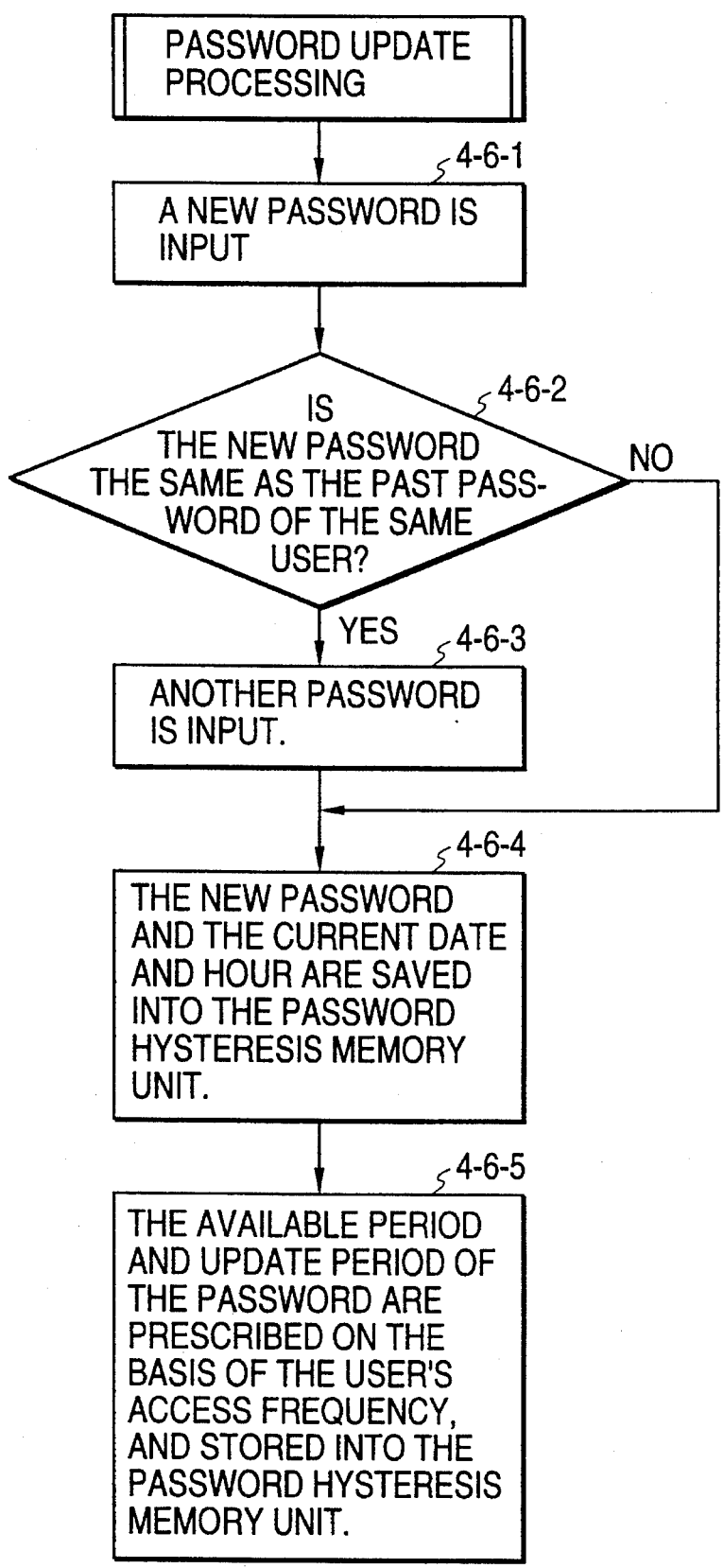
FIG. 4b is a flow chart of password update processing according to the invention.

Next will be described in detail the processing operation of this embodiment of the invention with reference to FIGS. 1, 4a and 4b together.

First, when the user, upon logging the computer system in, inputs his user number and password through the input unit 6, these user number and password are sent to the comparator unit 2 via the update processing unit 5 (step 4-1).

The user number is also sent from the input unit 6 to the period setting unit 3, and the chronometric unit 1 sends to the period setting unit 3 the date and hour of the access by the user to the system.

Here the period setting unit 3 records user numbers and the dates and hours of accesses by users to the system on a user-by-user basis and, on the basis of these records of accesses, figures out the average access interval of the user when determining the available period of his password at the time of setting the password. The available period is prescribed to be at least sufficiently longer than this average access interval.

Further, a certain period preceding the expiration date and hour of that password is prescribed as the update set period for the password. For instance, if the available period is 30 days and 10% of it is defined to be the update set period, three days preceding the expiration of the available period will be the update set period, during which an access to the system would find the display of an alarm message requesting updating of the password.

Therefore, when a user has just begun using the system, the frequency of his accesses cannot be estimated, so that the initial available period should be prescribed not by the system itself but by the user or the system manager.

This available period of a password is automatically set or altered by the system, taking account of the frequency of the user's previous accesses to the system, every time his password is updated. The available period of the password prescribed by the period setting unit 3 is sent to the password hysteresis memory unit 4 and, with the user number as shown in FIG. 3 being used as key, information on the management of available periods and passwords is searched to compare the available period of the currently used password and the current time supplied by the chronometric unit 1 (step 4-2).

If the password is in its update set period but not yet updated, the password hysteresis memory unit 4 will notify the update processing unit 5 of the need for processing to update the password (steps 4-3 and 4-4).

The update processing unit 5, notified of the need to update the password, displays the password update requesting message on the display unit 7 to alert the user (step 4-5), and the user will input a new password through the input unit 6 (substep 4-6-1).

This password input through the input unit 6 is compared by the update processing unit 5 with the past passwords of the same user stored in the password hysteresis memory unit 4 to check if it is identical with any of the stored passwords (substep 4-6-2).

If there is found any identical password, the display unit 7 will display a reentry requesting message, and the user will reenter another password through the input unit 6 (substep 4-6-3).

If there is found no identical password, the update processing unit 5 will save the new password and the current date and hour into the password hysteresis memory unit 4 (substep 4-6-4). Then the period setting unit 3 calculates the frequency of the user's accesses to the system on the basis of the user number sent from the input unit 6, the current date and hour supplied from the chronometric unit 1 and the dates and hours of accesses up to the current time, prescribes the available period and update period of the password, and stores them into the password hysteresis memory unit 4 (substep 4-6-5).

After the new password is normally set, the system will permit logging in (step 4-9).

If the comparison of the current date and hour and the available period of the currently used password by the comparator unit 2 indicates that the password has already passed its due updating period and become invalid, the update processing unit 5 will be notified of that invalidation to alert the pertinent user.

The update processing unit 5 notified of the invalidation of the password comprises a password using characters which cannot be input from the input unit 6, saves it into the password hysteresis memory unit 4, and thereby invalidates the currently used password. This procedure makes it impossible for the pertinent user to log in the system thereafter (step 4-7).

Releasing the system from this state requires entry of a password validating instruction by the system manager through the input unit 6.

If a password validating instruction is input by the system manager through the input unit 6, the update processing unit 5 deletes from the password hysteresis memory unit 4 the password consisting of words which cannot be input from the input unit 6, replaces it with the latest password, and alters the system into a state permitting logging-in for a very short period of time (step 4-8). Since the user can log in the system with his latest password within this short period, if he updates his password then, he will be able to use the system again thereafter (steps 4-6 and 4-9).

As hitherto described, the present invention makes it possible to prescribe the available period and updating period for each user according to the frequency of his accesses to the computer system and to urge the user in advance to change his password on the basis of these periods. Therefore, the invention has the effects to prevent the available period of the password of a user who accesses the system only occasionally from expiring during a long interval between accesses and to relieve him from the risk of becoming unable to log in the system on account of his unawareness of the imminent expiration of the available period of the password and resultant failure to update the password in time.

Furthermore, for users having failed to update their passwords after the expiration of their respective updating periods, the security of the system can be ensured by immediately invalidating their set passwords.

What is claimed is:

1. A password updating system for a computer system, comprising:

chronometric means for counting and providing date and hour information;

input means for inputting user information and passwords, and password validating instructions for cancelling password invalidation;

display means for displaying a password change requesting message and a password reentry requesting message;

password hysteresis memory means for memorizing and managing a plurality of passwords so far set including a currently used password, and an available period and an update period for each of said passwords on a user-by-user basis;

comparator means for comparing, when a password is entered into a computer system, a current date and hour from said chronometric means and the available period of the currently used password stored in said password hysteresis memory means, and during the updating period of the currently used password, providing an update request to update the password;

update processing means responsive to the update request from the comparator means for giving a request for display of the password change requesting message to said display means, receiving an updated password from said input means, searching the plurality of passwords stored in said password hysteresis memory means to check whether or not the updated password exists among the plurality of passwords, displaying the password reentry requesting message if it does or updating the password if it does not, invalidating the current password if the updating period of the password has expired, and validating invalidated passwords; and period setting means for analyzing a frequency of accesses to the computer system by each user by receiving a date and hour of access to the system from said chronometric means and receiving the user information from said input means at the date and hour of access, prescribing upon setting of each password the available period and the update set period of the password, and conveying the available period and the update set period to said password hysteresis memory means.

2. A password updating system, as claimed in claim 1, wherein said period setting means, in prescribing the available period and the update set period of each password, memorizes the time of each user's access to the system as analysis of the frequency of the user's accesses to the system, calculates an average interval of accesses by each user, sets a period longer than the average access interval as the available period of the password, and prescribes the update set period.

\* \* \* \* \*